United States Patent Office 2,836,816
Patented May 27, 1958

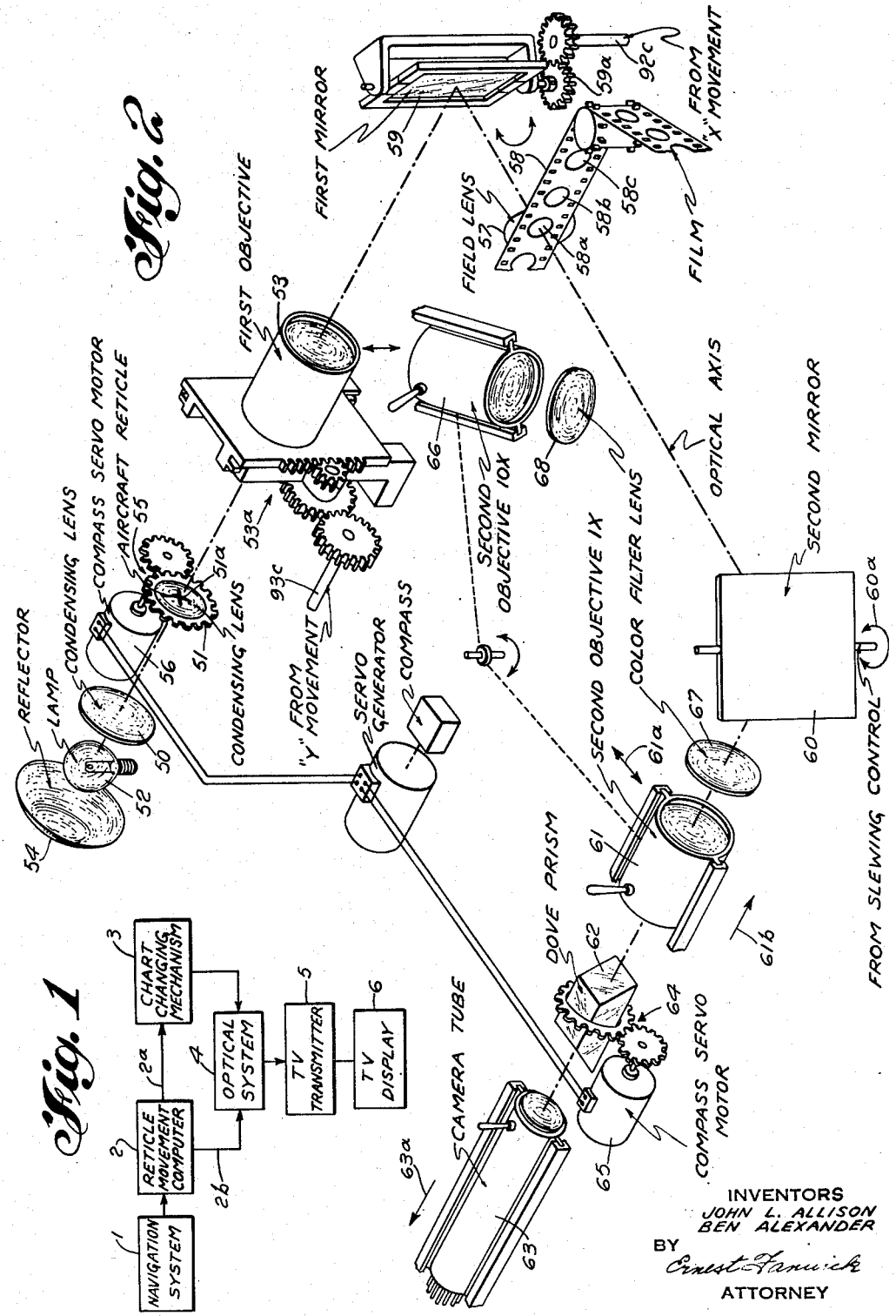

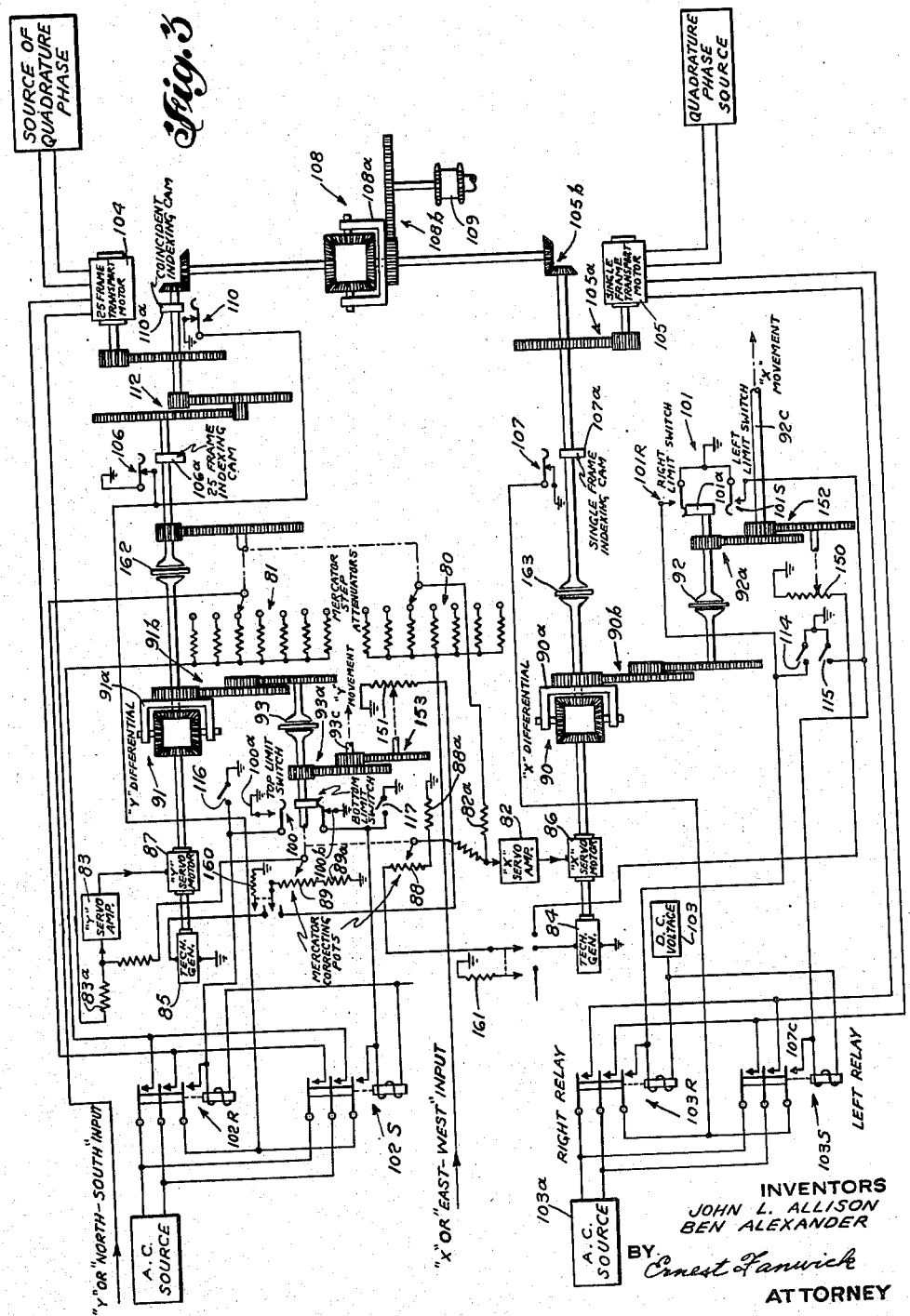

2,836,816
AIRBORNE PICTORIAL NAVIGATION COMPUTER

John L. Allison and Ben Alexander, Nutley, N. J., assignors to International Telephone and Telegraph Corporation, Nutley, N. J., a corporation of Maryland Application May 11, 1954, Serial No. 428,886

16 Claims. (Cl. 343—112)

This invention relates to an airborne pictorial navigation computer and more particularly to an airborne system for continuously representing on a map an aircraft's exact location and heading throughout a given flight.

Information from omni-bearing distance (OBD) navigation systems has heretofore been available to the pilot usually in the form of meter readings on a distance meter and an azimuth meter. Since the pilot knows the given location of the ground station transmitting the navigational information, he is able to compute his own position from the meter indications. Although this is an exceedingly simple computation, experience indicates that a pictorial display permits more effective pilot use of the omni-bearing distance information than does meter display.

There are also self-contained, i. e., dead reckoning navigatonal systems which indicate an aircraft's position in values of lattitude and longitude completely independent of any cooperating ground installation. From the information obtained from the dead reckoning navigational system the pilot is able to plot his position on a chart or map representing the region being navigated but the necessity of carrying and selecting the proper charts or maps and the expense of the pilot's time and attention for this operation makes such a system undesirable for any aircraft and for a high-speed single seat fighter aircraft, entirely impracticable.

A computer which is capable of automatically computing the position of an aircraft from the distance and azimuth information of an omni-bearing distance navigation system or from the latitude and longitude of a dead reckoning navigation system and providing a pictorial display of this information on a chart or map performs a useful and desirable function. If, in addition to the location of the aircraft, such a display includes the instantaneous heading of the plane, such information being obtained from the flux gate, or other suitable, compass, the pictorial display completely and satisfactorily solves the most important navigational problems faced by any aircraft pilot.

Projection type pictorial computers have been developed for solving the above described navigational problems. This known equipment permits the pilot to select a chart or map of the region being navigated and causes it to be projected upon a translucent screen located in front of the pilot. Similtaneously, with the projection of the chart the computer causes an image or a "bug" of the aircraft to be projected in silhouette upon the map. The location of the "bug" relative to the map is derived from the information provided by a cooperating navigation system and the heading of the "bug" is derived from the output of the flux gate compass. The advantages of this system are so evident and so attractive that pilots and navigators immediately evidenced an active interest in its adoption. In addition to greatly simplifying the major problems of short range navigation, it appears that in high-speed aircraft, where fuel consumption is a major factor, the shortening of flight routes and the reduction in holding time over an airport accomplished by the use of the known pictorial display computer frequently results in large savings of fuel. Due to such attractive features the early adoption of a pictorial display system appears very desirable except that the size of the projection type display equipment which must necessarily be placed close to and in front of the pilot makes its installation in most aircraft a major operation in the redesign of the aircraft instrument panel and cockpit.

The most obvious disadvanatge of the known pictorial computer system is its large size and the necessity for awkward location within the cockpit directly in front of the pilot. The optical projection system which is the heart of the known pictorial computer prevents any great reduction in size of the over-all equipment. In order to present a display having a 10-inch diameter and of sufficient brilliance to be observed satisfactorily in daylight, the size of the light source and the general dimensions of the optical components have a theoretical lower limit which, it is reasonable to assume, the designers have approached by intelligent engineering. It, therefore, becomes readily apparent that in order to greatly reduce the size of an airborne pictorial display equipment which must be placed before a pilot, a fundamentally different principle of presentation must be employed.

Another disadvantage of the projection type pictorial display computer known to the prior art, while not as serious as its awkward and inconvenient size, is the means employed for selecting the map to be projected upon the screen. In the known equipment the pilot operates a reversible motor by means of a slewing control causing the reel of film on which the maps are printed to be transported in either direction through a film gate until the desired film frame is attained. The selection of the map to be displayed requires a major portion of the pilot's attention while the film frame and thus the map is being changed. The equipment is designed to use a separate reel of film for each commercial air route and adjacent maps are printed on each reel in successive order. Thus, it is only necessary for the pilot to progress one film frame at a time when following the air route for which the film reel has been arranged. This arrangement obviates the need for the pilot to scan a large number of charts while following a standard air route, but it does not take care of the important situations where a plane departs from the standard air route and the pilot, in all probability, has a greater need for knowing his exact location. Another disadvantage of the known system is that it requires different reels of films be provided for an aircraft which flies different routes. A system which automatically selects a desired chart from a reel of film containing all the charts within a reasonable area is much to be preferred, both from the flexibility of the equipment, the simplicity of installing the same film in all aircraft and its adaptation to emergency situations.

In the known prior art projection type equipment the mechanism causing the aircraft "bug" to move in azimuth and range from the center of the projected display is combined with the mechanism which causes the "bug" to assume headings dictated by the flux gate compass. This combined mechanism operates by causing a reticle on which an aircraft silhouette is printed to be rotated by servo mechanisms and to be translated by distance and azimuth servos. Such a system results in complexity of equipment in order to perform these combined functions and thus presents a major problem in construction and maintenance, as well as introducing a backlash which limits the accuracy of the system.

One of the objects of this invention, therefore, is to provide an improved airborne pictorial navigation computer.

Another object of this invention is the provision of such a navigation computer which is flexible enough to use the data input of various types of navigation systems to generate signals for display of navigational information on a cathode ray tube at a remote location.

A further object of this invention is the provision for an airborne pictorial navigational computer suitable for use in small aircraft and requiring a minimum of pilot attention which automatically displays an image of the aircraft at its precise location on a map of the area which is automatically selected.

Still a further object of this invention is the provision of an airborne pictorial display system capable of indicating an aircraft position anywhere within a very wide area and not limited to predetermined routes.

In accordance with one of the features of our invention the optical computer and amplifying components of the pictorial display system are situated at a remote location within the aircraft and a closed circuit television system is utilized to transmit the display of the optical system to a small cathode ray display screen which can be located in the cockpit along with a small control panel. The navigation charts are printed on a reel of motion picture film which can be manually selected to obtain the chart showing the aircraft's point of departure and automatically operated so that subsequent charts are chosen, without any attention by the pilot, responsive to the route the aircraft flies, provided only that the aircraft does not go beyond the region covered by the charts in the reel of film. The chart projection permits the computer mechanism of the pictorial display to substantially correct the distortion due to the curvature of the earth.

Another feature of this invention is to provide magnification of the navigation display either by changing the size of the cathode ray display tube at any time without replacing the remaining portion of the display system equipment except possibly the high voltage power supply which should be increased when a larger display tube is used or by the variation of components within the optical system.

A further feature of this invention is the provision for a manual selection by the pilot for the display in which either the silhouette of the aircraft points in a single direction regardless of the aircraft's flight, in which case the display of the map is moved according to the heading of the aircraft, or a display wherein the map will maintain its direction and the silhouette of the aircraft will be moved in accordance with its heading.

The above-mentioned and other features and objects of this invention will become more apparent by reference to the following description taken in conjunction with the accompanying drawings, in which:

Fig. 1 is a schematic diagram in block form of one embodiment of the airborne pictorial navigation system of this invention;

Fig. 2 is a simplified schematic diagram of the optical system for use in the pictorial navigation system shown in Fig. 1; and Fig. 3 is a schematic diagram of the computer circuits for map selection and scale compensation for use in the pictorial navigation system shown in Fig. 1.

Referring to Fig. 1 of the drawing, a block diagram of one embodiment of an airborne pictorial navigation computer system in accordance with the principles of this invention is shown to be operable from the output of the navigation system 1. The navigation system 1 may be a dead reckoning navigation system whose output comprises cartesian coordinates of latitude and longitude indicating the position of the vehicle or the output of the navigation system 1 may be similar to the visual omnirange-distance measuring equipment (VOR-DME) navigation system (OBD) whose positional information output comprises the azimuth and distance from the known position of a ground beacon. In either case the output of the navigation system 1 is coupled to the reticle movement computer 2 of the airborne pictorial navigation computer of this invention. Obviously as the aircraft's silhouette which comprises the reticle is moved responsive to the reticle movement computer 2 to any edge of the map or chart being displayed it is necessary that the chart be changed to the next successive area and thus one output 2a of reticle movement computer 2 controls the chart changing mechanism 3 while the other output 2b, of the reticle movement computer 2 is coupled to the optical system 4 to control the actual movement of the aircraft silhouette over the face of the display. Since the film is actually a part of the optical system 4 the output of the chart changing mechanism is coupled to the optical system 4 to control the movement of the film. The output of optical system 4 is projected onto a camera tube on the closed circuit television transmitter 5 whose output is coupled to a remotely located television display system 6. The television transmitter 5 and display unit 6 may comprise any type of well-known closed circuit television system. No further explanation of the navigation system 1 is felt to be necessary since as hereinafter explained the airborne pictorial navigational computer of this invention is designed to cooperate with the output of substantially all the known airborne navigation systems.

Referring to Fig. 2 of the drawing, a simplified schematic illustration of an optical system for use in an airborne pictorial navigation computer in accordance with the principles of this invention is shown. The optical system 4 of Fig. 1 is shown in Fig. 2 to comprise a pair of condensing lenses 50 and 51 which projects an image of the lamp 52 onto the first objective 53. A spherical reflector 54 is positioned to throw an inverted image of the filament of lamp 52 upon the plane of the lamp filament thereby providing efficient use of the aperture of the first objective lens 53. On condensing lens 51 a silhouette 51a of the aircraft is painted or applied by photographic methods to form an aircraft reticle. The lens 51 may be supported in an annular bearing system and the aircraft reticle may be rotated by means of gears 55 under the control of the compass servo motor 56 which is responsive to the output of the flux gate or other compass. Thus the nose of the plane faces up when the compass heading is north and the image 51a rotates responsive to the plane's heading. It should be pointed out that the reticle on lens 51 has no motion other than rotation. The first objective lens 53 projects an image of the aircraft reticle onto a plane beyond the field lens 57 in which the film 58 is present after the first mirror 59 causes the rays to be folded 90°. The field lens 57 is chosen to throw an image of the first objective lens 53 onto the second objective lens 61. In the plane beyond the field lens 57 on which the reticle is focused is the film gate containing the motion picture film 58 on which the aircraft navigational charts 58a, 58b, 58c are printed. Light passing through the film gate is projected onto a second mirror 60, which causes a second 90° folding of the optical axis, and then onto a second objective lens 61. The second objective lens 61 projects an image of the film 58 including a silhouette of the aircraft due to the reticle 51 through a dove prism 62 onto the camera tube 63. The dove prism 62 may be rotated by means of gears 64 and motor 65 as hereinafter explained. The dove prism 62 located between the second objective lens 61 and the camera tube 63 can be, when so desired, geared down 2 to 1 with the aircraft reticle drive 55 in which case the silhouette of the aircraft reticle is always directed upwards upon the display and the map or chart will seem to follow the aircraft's heading.

The image of the aircraft silhouette upon the chart is moved in the X or east-west direction on the display by the yoke or longitude mechanism 59a which results in an angular rotation of the first mirror 59. The horizontal or X movement of the aircraft silhouette on the film is equal to the tangent of twice the first mirror 59 rotation multiplied by the distance from the first mirror's axis of rotation to the film. This of course is in accordance with well-known laws of optics. The image of the aircraft silhouette upon the chart is moved in the Y or north-south direction by the rack and pinion or latitude mechanism 53a which results in a vertical motion of the first objective lens 53, this movement multiplied by the ratio of the sum of the first and second conjugate focal lengths, divided by the first conjugate focal length yields the distance of movement of the silhouette on the display. It should be pointed out that the X motion can be accomplished by a horizontal movement of the first objective lens 53 analogous to its vertical movement for accomplishing the Y value variation. However, applying both X and Y values to separate components yields a simpler mechanism than if the two motions are applied to the same component.

A 10 to 1 change in scale displayed can be accomplished by magnifying the desired area of the map by a factor of ten. Since it is assumed that high resolving power 35 mm. film is utilized, there will be no loss of resolution in this system due to the magnification of the order of 10 times. When magnification is desired, it is merely necessary that the map and the superimposed silhouettes be moved (by slewing controls) so that the reticle is in the center of the normal display screen and then substitute a 10-power second objective 66 at the proper point in the optical path for the one power second objective 61. The motion of the map in slewing to cause the aircraft's image to be in the center portion of the display is accomplished by motion of the second mirror 60 as indicated by arrow 60a and second objective 61 as indicated by arrow 61a in a manner similar to the motion of the aircraft silhouette. For simplicity in the drawing the slewing controls are not shown.

Alternately a change in the scale of the display, that is an increase in the magnification of the film upon the camera tube can be achieved by moving the second objective 61 toward the second mirror 60 as shown by arrow 61b while moving the pickup tube 63 in the opposite direction as shown by arrow 63a. If these two motions are along the optical axis, the resulting magnified image is centered on the center of the film frame. It is of course preferable to center the magnified image on the spot covered by the aircraft silhouette and this can be accomplished by combining the axial displacement of the second objective 61 and camera tube 63 by a vertical displacement of the objective lens 61 and a rotation of the second mirror 60 to duplicate approximately the equivalent motions of the first objective 53 and first mirror 59. The displacement of the second objective 61 and the rotation of the second mirror 60 during magnification of the display do not have to duplicate those of the first objective 53 and first mirror 59 precisely, since departure from the ideal results only in the display being centered at other than the precise position of the silhouette and does not cause erroneous indications of the aircraft location on the chart display.

When the enlarged map is displayed it must have greater detail and different lettering than the small map in order to be most useful. One system for accomplishing this objective is to prepare the film in two complementary colors, one for each scale to be utilized. The two second objective lenses 61 and 66 will then have associated with them the proper complementary filters 67 and 68 respectively, for each of the scales, so that only the desired map detail is projected onto the camera tube 63. The use of color film and color filters yields the desirable ability to store two sets of maps in the space normally required by one, in addition to supplying superior resolving power.

Of course, by changing the magnification a light intensity problem arises since the magnified image would normally be 100 times less bright due to the 10 power magnification. However, this can be corrected by one or both of the following methods: the fact that the light available can be made many hundreds of times more intense without penalty allows correction by means of loss and thus the first method is to provide sufficient loss in the color filter 67 associated with 1X second objective 61 while the other method is to focus the light source on the 10X second objective 66 and accept the resulting light loss in 1X second objective 61. In either case proper light intensity is provided for the proper display.

Referring to Fig. 3 of the drawing, a schematic circuit diagram of one embodiment of the reticle movement computer 2 and chart changing mechanism 3 of Fig. 1 is shown. Again, let it be assumed for purposes of explanation that the output of the navigation system 1 comprises signals representative of the latitude and longitudinal movement of the aircraft over the surface of the earth, i. e., cartesian coordinates of the X and Y movements respectively.

The ideal map for use with the pictorial navigation computer of this invention would have a projection in which the direction of latitude and longitude lines would not introduce error into the position of aircraft display. The areas of the map would not be distorted beyond visual recognition nor would distortion due to the curvature of the earth require complex mechanisms for correction. It would also be desirable to use a standard map projection readily available and on which straight lines represent great circles.

The best compromise of the above requirements is obtained by using a Mercator projection wherein the meridians and parallels are respectively vertical and horizontal at all places. Therefore the east-west and north-south components of aircraft velocity are correctly represented by the X and Y movements on the chart. The "X" and "Y" voltages representing latitude and longitude movement of the aircraft, comprising the output of the navigational equipment 1, are shown entering the left side of Fig. 3 and are coupled to the Mercator step attenuators 80 and 81 respectively which reduce the input voltages by factors dependent upon the latitude of the chart being displayed and the steps of the attenuators are changed in value only when the aircraft passes from one chart to another chart representing a region to the north or to the south of the first chart displayed and thus changing the latitude of the aircraft. Thus, maps of different scales may be used for areas in different latitudes. The attenuation factors of the Mercator step attenuators 80 and 81 are inversely proportional to the cosine of the latitude which is the southern boundary of the chart being displayed if the chart is in the northern hemisphere and the latitude which is the northern boundary of the chart if it is in the southern hemisphere.

The output of the Mercator step attenuators 80 and 81 comprising factors of the X and Y input voltages are coupled to the servo amplifiers 82 and 83 through resistors 82a and 83a where the output voltages of the attenuators 80 and 81 are balanced against voltages from the tachometer generators 84 and 85 which are developed responsive to the operation of the X and Y servo motors 86 and 87. The outputs of the tachometer generators 84 and 85 are coupled through the Mercator correcting potentiometers 88 and 89 which reduce the voltage output of the generators 84 and 85 by factors which are directly proportional to the cosine of the latitude of the aircraft. The variation in value of cosine latitude across the vertical dimensions (north-south direction) of the charts is greater in high latitudes than in low latitudes. Such a correction is necessary since the variation in value of the latitudes across the vertical dimension of the chart is not linear. The fixed resistors 88a and 89a which are in series with the Mercator correcting potentiometers 88 and 89 could be varied by the same stepping switches which varies the stepping attenuators 80 and 81, but in order to avoid complexity in the drawing this resistance varying mechanism has not been illustrated. Because of the Mercator step attenuators 80 and 81 which correct the input voltage for charts of various latitudes and because of the Mercator correcting potentiometers 88 and 89 which correct for variation of latitude within each chart the distortion due to the curvature of the earth is completely corrected. The Mercator step attenuators are varied automatically as charts are changed and the potentiometers 88 and 89 are varied automatically as the aircraft moves north or south.

The output of each servo amplifier 82 and 83 comprising an error voltage indicating the amount of correction that should be applied to the aircraft silhouette in an X and Y direction respectively drives a servo motor 86 and 87 which, in turn, in addition to driving the tachometer generators 84 and 85 has another output coupled as one input of differential gears 90 and 91 and the output of the differential gears 90 and 91 are couped to "Y" yokes 90a and 91a and through gears 90b and 91b and slip clutches 92 and 93 and gears 92a and 93a to supply the mechanical movement to the aircraft silhouette in the X and Y directions as indicated by shafts 92c and 93c. As long as the second input to each of the two differential gears 90 and 91 does not change, the servo motors 86 and 87 alone cause the motion of the aircraft's silhouette to vary and thus be directly responsive to the corrected input voltages and thus the portion of Fig. 3 above described may be termed the airplane silhouette or reticle movement computer 2 of Fig. 1.

The remainder of Fig. 3 may be termed the chart changing mechanism 3 of Fig. 1, and is shown to be actuated by the top-bottom limit switch 100 and the right-left limit switch 101 which, in turn, are operated in conjunction with the X and Y output of the reticle movement computer 2 shown in Fig. 1. In the case of the X movement the cam 101a actuates the right limit switch 101r when the aircraft silhouette reaches the right boundary of the chart and the cam 101a actuates the left limit switch 101s when the aircraft reaches the left boundary of the chart. Of course, it must be understood that there preferably is a region of overlap between adjacent charts. When either the left or right limit switch 101s or 101r is closed a source of direct voltage 103 is coupled to the coil of either the left relay 103s or the right relay 103r closing the relay's contacts. When the relay's contacts are closed a source of 400 C. P. S.-A. C. energy 103a is coupled to the single frame film transport motor 105 which is then operated. A source of 400 cycles per second quadrature phase voltage is coupled to motor 105 so that the direction of operation of motor 105 is dependent upon whether the left or right limit switch 101s or 101r is closed, ultimately causing the film to be transported in the correct direction. As motor 105 starts to operate, the single frame indexing cam 107a causes switch 107 to close causing the relay 103r or 103s to remain actuated even after its associated limit switch 101r or 101s is no longer closed and until such time as the film is transported a distance equal to a single frame in the correct direction. The output of the single frame film transport motor 105 is coupled through gear arrangements 105a and 105b to the film transport differential 108 whose output, coupled over "Y" yoke 108a and gears 108b, actuates sprocket wheel 109 and causes the reel of film to progress one frame before the single frame indexing cam 107a opens the switch 107 unlocking the operating relay 103r or 103s, removing the source of energy from motor 105 and stopping it. The operation of motor 105 and gears 105a also causes the rotation of the second input to the X differential gear 90 causing the X movement output to return the aircraft silhouette to the opposite side of the chart displayed which would then correspond to the aircraft's position on the new chart just moved into position. The above description explains how a chart is automatically displayed on the aircraft navigation pictorial computer of this invention as a plane crosses the east-west boundary of any one map or frame of the film reel.

For purposes of explanation only, let it be assumed that the charts are located on the reel of film in consecutive order across one span of latitude for 25 charts, and then the next 25 film frames represent the 25 regions directly north of the first 25 film frames. The third series of 25 film frames contain charts of the region still further north and so on. Thus, by this arrangement the chart representing the region east or west of any given chart can be acquired by transporting the film one frame forward or backward while the chart representing the region directly north or south of any one chart can be acquired by transporting the film 25 frames forward or backward.

Referring again to Fig. 3, it is seen that the top-bottom limit switch 100 has either the upper limit switch 100a or the lower limit switch 100b actuated by the output of the Y movement when the aircraft silhouette reaches the upper or lower boundary of the chart being displayed. Relays 102r and 102s are analogous to relays 103r and 103s in the X portion of the chart changing mechanism and in a similar manner cause the operation of the 25 frame transport motor 104 causing the reel of film to progress forward or backward according to whether limit switch 100a or 100b has been crossed and whether the top or bottom limit of the chart has been reached by the aircraft silhouette. After 25 film frames have progressed the 25 frame index cam 106a and the coincident indexing cam 110a simultaneously open switches 106 and 110 stopping motor 104 and indexing the film. By means of a 25:1 gear reduction system 112 the motor 104 causes the second input to the Y differential gear 91 to turn an amount equal to the vertical height of the chart, thus causing the aircraft silhouette to return to the other boundary of the newly displayed chart.

Although the single frame transport motor 105 and the 25 frame motor 104 have been described separately, it is possible for both their operations to be carried on simultaneously because the transport of the film itself is caused by summing the rotation of the two film transport motors 104 and 105 through a film transport differential 108.

The setting of limit switches 100 and 101 should be such that they are not actuated until the aircraft has traversed most of the overlap region which appears on contiguous maps. This is to prevent a possible error in automatic map selection which might otherwise occur if the limit switches were actuated at the midpoint of the overlap region and the aircraft performed maneuvers causing it to traverse back and forth over the boundary.

The slipping clutches 92 and 93 are necessary for manual selection of a chart at the point of departure. When charts are selected manually, switches 114 and 115 and 116 and 117 are thrown coupling power to the film transport system by the manual map selection switches instead of through limit switches 100 and 101. The manual map selection switches 114—117 function in the same manner as the limit switches 100 and 101 except under direct control of the operator instead of under control of the output from transducers 94 and 95. The manual selection of maps in general causes the aircraft silhouette to go to the edge of the display and since the X and Y differentials turn while the servo motors 86 and 87 are stationary the slipping clutches slip. After the desired chart has been selected, the X and Y servo motors 86 and 87 can be operated by a slewing control, not shown, until the location of the aircraft silhouette on the chart displayed corresponds to the aircraft displayed on the surface of the earth. The slipping clutches 92 and 93 also serve to prevent damage to the equipment if slewing controls which vary the aircraft silhouette are accidentally left on too long. These slewing controls are used to correct the position of the aircraft silhouette if dead reckoning navigational equipment is utilized and accumulates a sufficient error to require correction.

The operation of the airborne navigation pictorial computer of this invention is possible with information obtained from omni-bearing distance equipments (OBD) as well as from the navigational equipment which provides cartesian coordinates output as hereinbefore described, by comparatively minor additions to the reticle movement computer 2 and the chart changing mechanism 3. The pictorial information presented from information from omni-bearing distance equipments is of exactly the same display appearance as when operating from the dead reckoning navigational systems. Referring again to Fig. 3 of the drawing, the two inputs entitled X and Y must be switched from the cartesian coordinate input system to the azimuth and distance inputs obtained from the omni-bearing distance equipment. Instead of balancing the two output voltages of the tachometer generators 84 and 85, the two inputs from an omni-bearing distance equipment balance the outputs of two linear potentiometers 150 and 151 which are mounted on the X and Y output movements by means of gears 152 and 153. The same servo amplifiers 82 and 83 and servo motors 86 and 87 are employed for operation from omni-bearing distance systems as well as from self-contained navigational systems. The output of the tachometer generators 84 and 85, when utilizing the omni-bearing distance information as the input for this system, are switched into damping circuits 160 and 161. Thus, it is obvious that the only additional equipment necessary to allow the computer of this invention to operate from omni-bearing distance equipment as well as from self-contained navigational equipment comprises the linear potentiometers 150 and 151 and the associated switching circuitry.

Of course, the charts, i. e., the frames on the film reel, which are used when omni-bearing distance navigation systems provide the input to the computer of Fig. 3 are each centered about a VOR–DME station location. The chart changing mechanism of Fig. 3 is modified so that when utilized with omni-bearing distance input it is isolated from the mechanisms which provides X and Y optical movement. This isolation is provided by the slip clutches 162 and 163 which isolate the differential inputs of gears 90 and 91 and disengage the shafts leading from the film transport motors 104 and 105.

When the chart changing mechanism is used with an omni-bearing distance equipment input, the switches 114–117 are positioned for manual operation which is the same position employed when selecting the point of departure chart when using a self-contained navigation system for the input. When the charts centered on the VOR–DME stations are to be selected the four chart selecting switches 114–117 select the numbered charts as follows: closing switch 116 selects a chart 25 numbers ahead while closing switch 117 causes the chart selector to stop at a chart 25 frames to the rear; closing switches 114 and 115 respectively will cause the chart transport mechanism to move the charts one frame forward or backward. By so manipulating the four switches 114–117 the operator is able to quickly select any numbered chart desired.

Obviously, it is possible for the pictorial navigation computer of this invention to operate from the information provided by two VOR ground beacons which provide information in the form of azimuth values from each of two fixed stations to the aircraft, these azimuths being measured from the meridian to each fixed station. All that is necessary in additional equipment is an additional computer which will convert the two azimuth values obtained from the ground beacons into cartesian coordinates which will operate as the X and Y input to the reticle movement computer 2.

While we have described above the principles of our invention in connection with specific apparatus, it is to be clearly understood that this description is made only by way of example and not as a limitation to the scope of our invention as set forth in the objects thereof and in the accompanying claims.

We claim:

1. A display system for displaying the position and movement of a craft with respect to a given area comprising a camera tube, means for producing a representation of said area, means for producing an optical representation of said craft, means for projecting said area representation and said craft representation onto said camera tube, navigation system means for determining the location of said craft, means responsive to the output of said navigation system for controlling said projection means for moving said craft representation on said camera tube to depict the movement of said craft relative said area, a television display unit and means to couple to said unit the images projected onto said camera tube.

2. A display system for displaying the position and movement of a craft with respect to a given area comprising a camera tube, means for producing a representation of said area, means for producing a representation of said craft, means for projecting said area representation onto said camera tube, an optical system including at least said camera tube, an optical system including at least first and second optical devices for projecting an optical image of said craft representation superimposed on said area representation onto said camera tube, navigation system means for determining the location of said craft within said area, means for moving said first and second otpical devices responsive to the output of said navigation system means to cause the optical image of said craft representation projected on said camera tube to depict the movement of said craft, display means remote from said camera tube, and means to couple to said display means the images projected onto said camera tube.

3. A display system according to claim 2 wherein said navigation system includes a compass and said display system further includes means for controlling said means for producing a representation of said craft responsive to said compass heading.

4. A display system according to claim 3 which further includes means to rotate the images projected onto said camera tube to cause the representation of said craft to remain in a predetermined direction.

5. A display system according to claim 2 which further includes means to vary said area representation responsive to the movement of said craft representation.

6. A display system for displaying the position and movement of a craft with respect to a given area comprising image transmission means to transmit signals representing an image to a remote location, means for producing a representation of said area, means for producing an optical representation of said craft, means for projecting said area representation and said craft representation onto said image transmission means to form said image, navigation system means for determining the said location of said craft, means responsive to the output of said navigation system for controlling said projection means for moving said craft representation on said image transmission means to depict the movement of said craft, means at said remote location to translate said transmitted signals onto said image representation and means to couple to said translator means the output of said image transmission means including the images projected onto said transmission means.

7. A system according to claim 6 wherein said means for producing a representation of said area comprises means for producing representations of a plurality of sections within said area and means responsive to the movement of said craft representation to select one of said plurality of section representations for projection onto said image transmission means.

8. A display system according to claim 6 which further includes means to vary in a predetermined manner the movement of said craft representation responsive to a change of section representation.

9. A system according to claim 6 which further includes means to very the input to said means responsive to the output of said navigation system responsive to the section of area being projected onto said image transmission means.

10. A display system for displaying the position and movement of a craft with respect to a given area comprising a television transmitter having a camera tube, means for producing a representation of a plurality of sections within said area, means for producing a representation of said craft, means for projecting one of said section representations onto said camera tube, an optical system including at least a first and second optical device for projecting said craft representation superimposed on said section representation onto said camera tube, navigation system means for determining the location of said craft within said section, the output of said navigation system comprising coordinates in two directions orthogonally related to each other, means for moving said first and second optical devices responsive to the orthogonal outputs of said navigation system, means to cause said craft representation projected on said camera tube to depict the movement of said craft relative to the projected area, display means for the output of said television transmitter and means to couple to said last mentioned means, for display, the images projected onto said television camera tube.

11. A display system according to claim 10 wherein said means for producing a representation of said craft further includes means responsive to the heading of said craft to maintain the orientation of said representation in proper relation to the heading of said craft.

12. A display system according to claim 10 wherein said means for producing a representation of a section of said area comprises at least two sets of information which may be color selected and said means for projecting said section representation onto said camera tube includes color filter means for selecting one of said two sets of information.

13. A delay system according to claim 10 wherein said optical system further includes a third optical device and means to move said third optical device along the optical axis of said optical system to vary the magnification of said projected representations.

14. A display system according to claim 13 wherein said means for producing a representation of a section of said area comprises at least two sets of information which may be color selected and said means for projecting said section representation onto said camera tube includes filter means for selecting one of said two sets of information and said system further includes means for selecting a color filter response to the position of said third optical device along said optical axis.

15. A display system according to claim 10 which further includes means to rotate said images projected onto said camera tube to cause the representation of said craft to remain in the predetermined direction.

16. A display system according to claim 10 wherein said optical system further includes a third and fourth optical device and means to move said optical device to maintain representation of said craft in the center of said display.

References Cited in the file of this patent

UNITED STATES PATENTS

| | | |
|---|---|---|
| 1,889,026 | Warrick | Nov. 29, 1932 |
| 2,027,527 | Hammond | Jan. 14, 1936 |
| 2,027,530 | Hammond | Jan. 14, 1936 |
| 2,062,003 | Hammond | Nov. 24, 1936 |
| 2,267,715 | Bowen | Dec. 30, 1941 |
| 2,307,029 | Elm | Jan. 5, 1943 |
| 2,399,671 | Gage | May 7, 1946 |